Feb. 9, 1960 W. J. ZENNER 2,924,452

TAPE FEED MECHANISM FOR A HIGH SPEED PUNCH OR READER

Filed April 30, 1957 3 Sheets-Sheet 1

INVENTOR
WALTER J. ZENNER
BY [signature]
ATTORNEY

TAPE FEED MECHANISM FOR A HIGH SPEED PUNCH OR READER

Filed April 30, 1957

3 Sheets-Sheet 2

INVENTOR
WALTER J. ZENNER

BY

ATTORNEY

TAPE FEED MECHANISM FOR A HIGH SPEED PUNCH OR READER

Filed April 30, 1957 3 Sheets-Sheet 3

INVENTOR
WALTER J. ZENNER

BY R. A. Nelson

ATTORNEY 2,924,452

TAPE FEED MECHANISM FOR A HIGH SPEED PUNCH OR READER

Walter J. Zenner, Des Plaines, Ill., assignor to Teletype Corporation, Chicago, Ill., a corporation of Delaware Application April 30, 1957, Serial No. 656,045

7 Claims. (Cl. 271—2.4)

This invention relates to a web feeding mechanism and more particularly to a reversible, intermittent feed device for indicia bearing tape such as printing telegraph tape.

In the telegraph communication field, tape employed as a medium for carrying indicia of telegraph signal code combinations is fed in an intermittent manner to either perforating devices for perforating the information into the tape or to reading devices for reading the information which has been perforated into the tape. The pawl and ratchet mechanisms usually used in devices of this type have been satisfactory in feeding the tape at speeds up to the neighborhood of 600 words per minute without danger of tearing the tape and will accurately position the tape for other operations. These indicia bearing tapes are also useful in feeding information into electronic computers and similar devices. These devices as well as the circuits used in transmitting telegraph messages, are capable of operation at exceedingly high speeds and consequently there is at present a demand for tape feeding devices which will feed and which will read tape at speeds much in excess of 600 words per minute, such as in the neighborhood of 2000 words per minute. With the type of mechanisms known heretofore for feeding the tape the very size or mass of the mechanism is such that they are incapable of operation at the required high rate of speed without the danger of tearing the tape.

It is an object of the present invention to provide a mechanism capable of feeding indicia bearing tape at high rates of speed.

Another object of the invention is to provide an apparatus which will intermittently feed the tape with a gradual acceleration and a gradual deceleration.

Another object of the invention is to provide an apparatus for feeding indicia bearing tape at high speed in either a forward or reverse direction without danger of damaging the tape.

A still further object of the invention is to provide an apparatus which will intermittently feed a tape having indicia represented therein in the form of perforations with a steady acceleration and deceleration.

In accordance with one embodiment of the invention a tape feed for high speed readers is provided with an eccentric drive which imparts reciprocatory and oscillatory movement to a pair of feed pawls, one for forward and the other for reverse feed, these feed pawls are mounted on suitable linkage which is effective upon the energizaiton of either one of a forward or a reverse magnet to block one end of the link pivoted to the feed pawl and to hold the feed pawl in a position where, upon its oscillation and reciprocation, it will engage the teeth of the sprocket wheel which in turn drives the tape feeding wheel of the device. In order to better illustrate the feeding mechanism it is disclosed in the accompanying drawings in connection with a reader which reads information from the tape.

The invention will be more readily understood by reference to the following detailed description when considered in connection with the accompanying drawings wherein.

Figure 1:
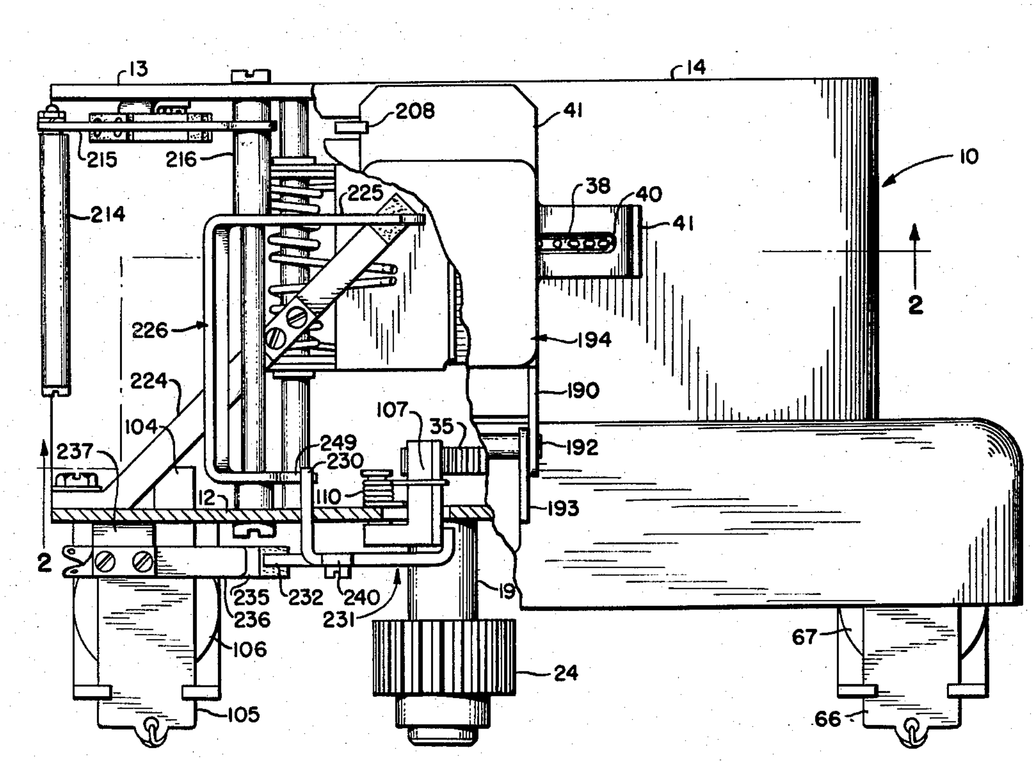
Fig. 1 is a plan view of a high speed reader embodying the feeding device of the present invention, parts being broken away more clearly to illustrate the parts positioned beneath them.

Referring now to the drawings, wherein like reference characters designate the same parts in the several views, it will be seen that the apparatus comprises a main housing 10 which encloses substantially all of the operating parts of the apparatus. The housing 10 includes a base plate 11, a front wall 12, a rear wall 13 and an irregularly shaped cover 14.

A main drive shaft 19 which supplies power for driving the various parts of the apparatus is journaled in bearings 20 and 21 which are mounted in the front wall 12 and rear wall 13, respectively. The shaft 19 is provided with two eccentric portions 22 and 23, the eccentric portion 22 serving to drive the reader mechanism and the eccentric portion 23 serving to drive the tape feed mechanism. The shaft 19 carries a suitable pulley 24 which may be connected through a belt (not shown), to any suitable driving source such for example as a synchronous motor (not shown).

*Tape feeder*

In order that a reader of the type covered by the present application achieve its highest possible utility in connection with electronic equipment, it is used in conjunction with an error detector which detects possible errors in a tape being read and consequently the tape feeding and reading mechanism must be capable of operation not only in a forward direction but also in a reverse direction so that a tape having an erroneous punching in it may be retracted and after being corrected may be reread. Consequently, the present invention contemplates the provision of mechanism for driving the tape either in a forward or a reverse direction. This result is achieved by making the eccentric portion 23 of the shaft 19 a compound eccentric capable of driving a forward feeding mechanism or a reverse feeding mechanism. To this end, a stationary pivot stud 25 is mounted in the front wall 12 of the housing and pivotally supports a link 26 for oscillatory movement. This link 26 has oscillatably mounted at its upper end portion a rocker member 27 which is pivoted to the link 26 at the midpoint of the rocker member. At one end the rocker member 27 has formed in it a bearing supporting ring 28 in which there is mounted a bearing 29 that surrounds one portion of the compound eccentric 23. By the provision of this mechanism rotation of the shaft 19 will cause oscillation to be imparted to the rocker member 27.

Pivotally connected to the rocker member 27 at its end remote from the shaft 19 is a driving pawl 30 which is in turn pivotally connected at its midpoint to a link 31. The driving pawl 30 has a bent-over tooth engaging portion 32 which is adapted to engage teeth 33 on a ratchet 35 which is fixed to a shaft 34. The shaft 34 is journaled in bearings 36 and 37 (Fig. 3) suitably mounted in the front plate 12 and rear plate 13 and carries a feed sprocket 38 having feeding projections 39 extending from it for engagement with feeding perforations in a tape (not shown). The feeding projections 39 extend into a slot 40 formed in a tape lid on guide plate 41 that cooperates with the upper surface of the housing cover on top plate 14 to define a tape slot 42 through which tape to be read may be fed by the feed sprocket 38.

Figure 4:
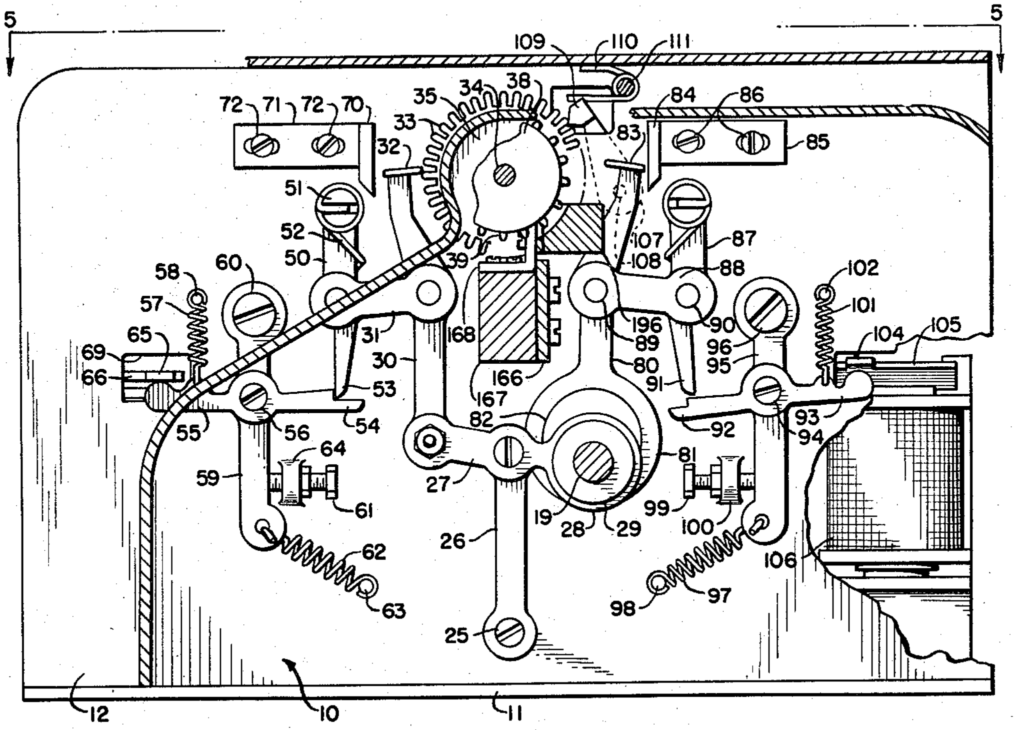
Fig. 4 is a sectional view taken substantially along the line 4—4 of Fig. 3 in the direction of the arrow.
Figure 5:
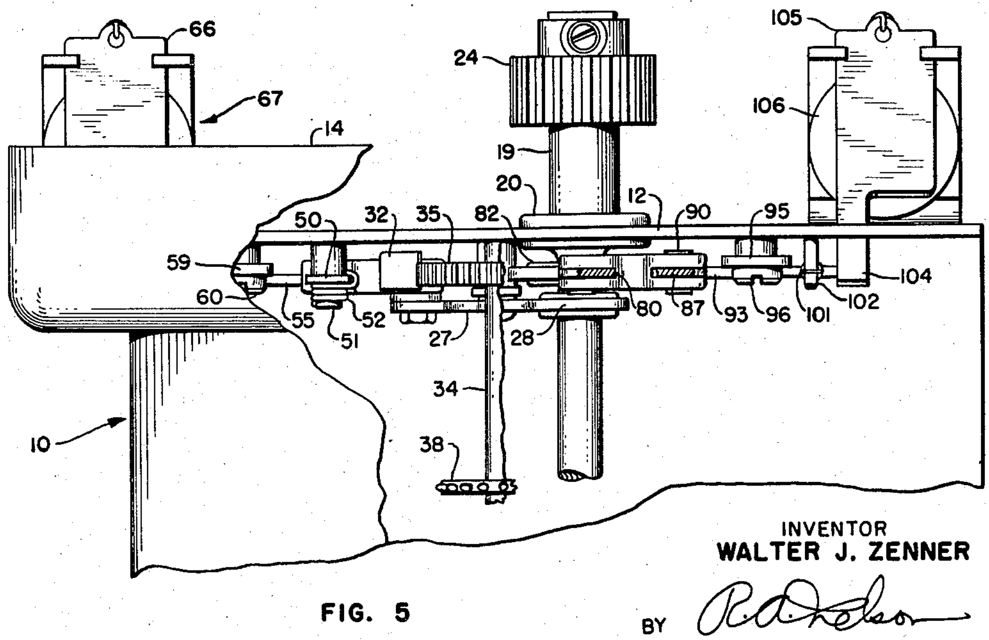
Fig. 5 is a plan view looking in the direction of the arrows 5—5 on Fig. 4, parts being broken away to illustrate clearly some of the features of the drive mechanism for the tape feed wheel.

The link 31 (Fig. 4) is pivotally connected to the midpoint of a locking lever 50 which is normally urged to rotate in a clockwise direction about a fixed pivot 51 by a spring 52 which encircles the fixed pivot 51 and is wrapped partially around the locking lever 50. The locking lever 50 in the position shown in Fig. 4 is latched in an operative position due to the engagement of its lower latching portion 53 engaging a latch 54 formed on the right-hand end of a latch lever 55. The latch lever 55 is mounted for oscillation about a pivot pin 56 and is normally urged to rotate in a clockwise direction about the pivot pin 56 by a contractile spring 57 attached to the lever 55 adjacent its left end and also attached to the front plate 12 at 58. The pivot pin 56 is carried by an adjustable lever at 59 pivotally mounted on a pivot pin 60 and held against a stop screw 61 by a contractile spring 62. The contractile spring 62 is fixed at one end to a pin 63 and at the other end to the bottom of the adjustable lever 59. The pin 63 is mounted on the front plate 12 as is the pivot pin 60 and the stop screw 61 is threaded into a boss 64 extending outwardly from the front plate 12.

The extreme left end (Fig. 4) of the latch lever 55 is rounded to engage an armature extension 65 formed on an armature 66 of an electromagnet 67. The electromagnet 67 is mounted on a bracket 68 (Fig. 3) which extends outwardly from the front face of the front plate 12 and the armature extension 65 extends through a suitable aperture 69 (Fig. 4) in the front plate 12 to engage the rounded end of the latch lever 55.

As shown in Fig. 4 the electromagnet 67 has attracted its armature 66 and has moved the latch lever 55 counterclockwise about its pivot 56. Under these conditions the driving pawl 30 will be held in a position where it will engage and drive the ratchet 35. However, if the electromagnet 67 is de-energized the armature extension 65 as viewed in Fig. 4 would be moved upwardly and the latch 54 would be moved downwardly to disengage from the latching portion 53 of the locking lever 50. This would permit the spring 52 to rock the locking lever 50 clockwise to a position where the left side (Fig. 4) of the tooth engaging portion 32 would engage with a bearing plate 70 carried by a bracket 71 which is adjustably mounted by means of screws 72 on the interior of the front plate 12. As the shaft 19 would continue to rotate under these conditions, the tooth engaging portion 32 would not engage with the teeth 33 on the ratchet 35 but would continue to reciprocate idly. Since the release of the electromagnet 67 results in the latch lever 55 being rotated clockwise, the latch on the latch lever will be disengaged from the latching portion 53 of the locking lever 50 and consequently the locking lever 50 will be rocked clockwise from the position shown in Fig. 4 and through the link 31 will move the driving pawl 30 over to a position where the tooth engaging portion 32 of the driving pawl will ride on the bearing plate 70 idly without engaging the teeth of the ratchet 35.

The driving mechanism for the tape, described in the preceding paragraphs, is the driving mechanism which drives the tape in a reverse direction. In order to drive the tape in a forward direction a driving pawl 80 similar to the driving pawl 30 is provided. This driving pawl 80 has a bearing supporting ring 81 mounted or formed integrally with it which carries a bearing ring 82 encircling and driven by the second portion of the compound eccentric portion 22. The driving pawl 80 is provided at its upper end with a tooth engaging portion 83 which, as shown in Fig. 4, is riding on a bearing plate 84 carried by a bracket 85 that is in turn suitably mounted on the inner surface of the front wall 12 by means of screws 86.

The driving pawl is connected to a locking lever 87 by a link 88 that is pivotally connected to the pawl 80 by a pivot pin 89 and is pivotally connected to the blocking lever 87 by a pivot pin 90. The lower end of the locking lever 87 is provided with a latch portion 91 engageable with a latch 92 formed on a latch lever 93. The latch lever 93 is oscillatable about a pivot stud 94 which extends from approximately the midpoint of an adjustable lever 95 that is pivoted at 96 on the front wall 12 of the housing and is urged to rock in a clockwise direction by a contractile spring 97 connected to a pin 98 mounted on the wall 12 and having its opposite end connected to the lower end of the adjustable lever 95. The adjustable lever is also provided with a stop screw 99 threaded into a boss 100 on the wall 12.

The latch lever 93 is urged to rock in a counterclockwise direction by a contractile spring 101 that is connected to the latch lever 93 adjacent the right end of the lever and is also connected to a pin 102 extending inwardly from the wall 12. The rounded right end (Fig. 4) of the latch lever 93 is positioned in the path of an armature extension 104 of an armature 105. The armature 105 is spring urged to the position shown in Fig. 4, away from the core of an electromagnet 106. When the electromagnet 106 is energized it will attract its armature 105 thus moving the extension 104 downwardly as viewed in Fig. 4 thereby to rock the latch lever 93 upwardly the first time in the cycle of the shaft 19 that the shaft 19 moves the driving pawl 80 toward the left (Fig. 4). The lower end of the driving pawl 80, of course, will be moved to the left upon rotation of the shaft 19 due to the fact that the right side of its tooth engaging portion 83 will rub on the bearing plate 84 and consequently when the high point of the eccentric extends to the left (Fig. 4) the latch lever 93 will be moved up to a position where the latching portion 91 on the locking lever 87 will catch on the latch 92.

With the apparatus described hereinbefore, the shaft 34 may be rotated in either direction and will be held in any position to which it is rotated by a latching pawl 107 that is pivoted on the front plate 12 by means of a pivot pin 108 and is urged to carry its tooth engaging portion 109 into engagement with the teeth of the ratchet 38 by a spring 110 wrapped around a pin 111 and having one end bearing against the upper portion of the housing 14 and the other end bearing against the upper end of the latching pawl 107.

From the foregoing it will be understood that whichever one of the driving pawls 30 or 80 that is activated due to the energization of its associated electromagnet 67 or 106, respectively, will engage and drive the ratchet 35. Due to the fact that the driving pawls 30 and 80 when driven, are driven by eccentrics on the shaft 19 and the fact that each of the driving pawls is pivotally connected to a link 31 or 88 which is in turn pivotally connected to a locking lever 50 or 87 the tooth engaging portions will be moved in an approximately circular path, first moving into engagement with the teeth 33 and then moving downwardly at a gradually accelerating speed up to the point of the highest speed and then at a gradually decelerating speed. After this gradual acceleration and gradual deceleration the driving or tooth engaging portions 32 will be retracted from engagement with the teeth 33 and moved up to engage a succeeding tooth 33. Thus, the tape fed by the feed sprocket 38 will be moved at a gradually accelerating speed and then at a gradually decelerating speed, will pause for a short time while the reading mechanism senses a tape, and will then be driven in a succeeding step.

*Tape reading mechanism*

Figures 2, 3:
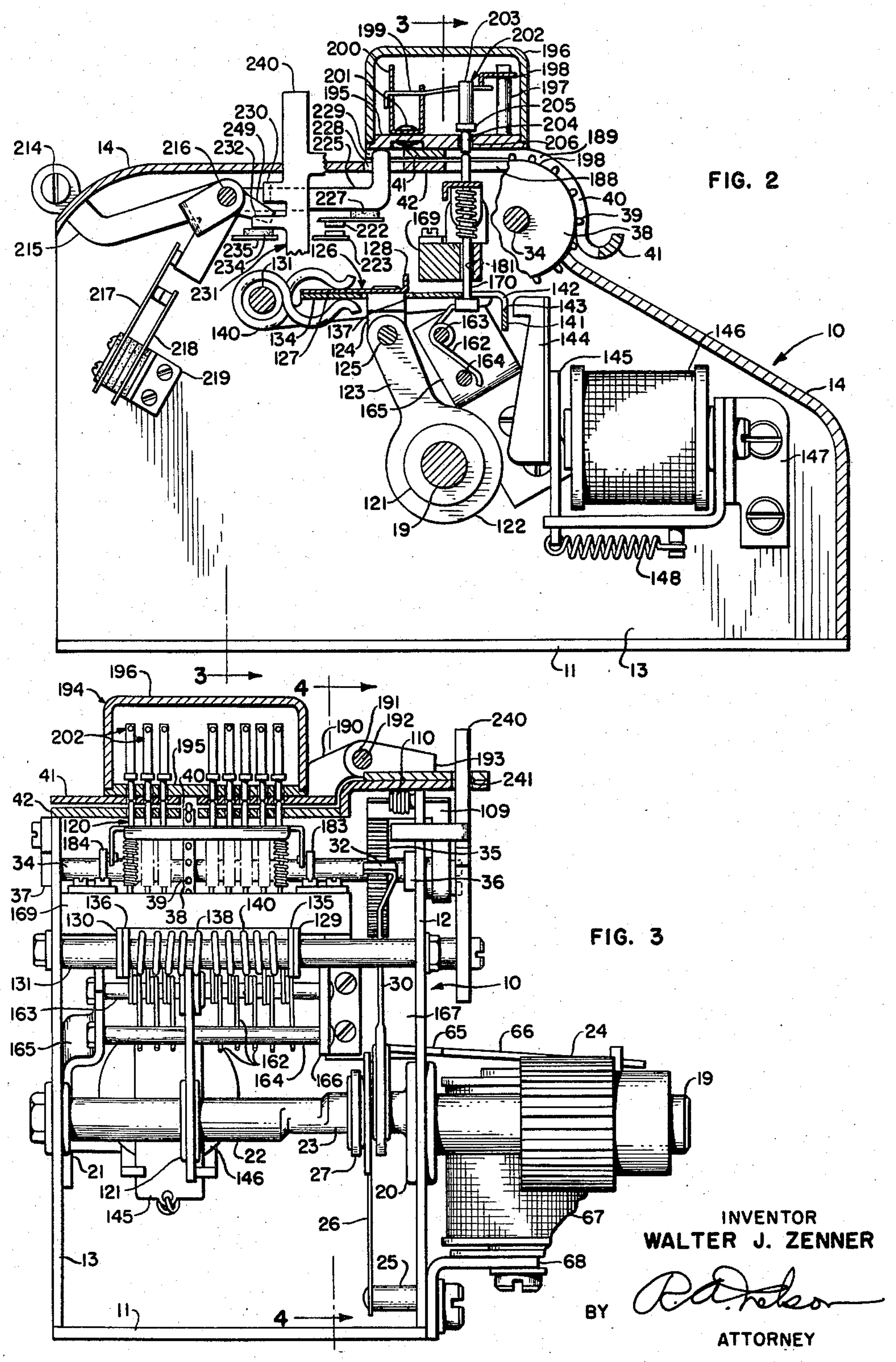
Fig. 2 is a longitudinal sectional view taken substantially along the line 2—2 of Fig. 1 in the direction of the arrows and showing numerous details of the tape reader mechanism.
Fig. 3 is a transverse sectional view taken substantially along the line 3—3 of Fig. 2 in the direction of the arrows illustrating details of both the reader device and the tape feeder.

In the interval when a tape is stationary due to the fact that the particular driving pawl 30 or 80 which is at that time operating is disengaged from the teeth 33, a series of sensing pins 120 are moved upwardly to either engage the underside of the tape or to pass through perforations in the tape. These sensing pins 120 must be moved in synchronism with the tape feeding mechanism and consequently the drive mechanism for them drives its power from the shaft 19. This driving mechanism for the sensing pins 120 is shown most clearly in Figs. 2, 3, 6 and 7 to which reference will now be had. A bearing 121 surrounds the eccentric portion 22 of the shaft 19 and is mounted in a bearing ring 122 formed integrally with the lower end of a driving member 123. At its upper end the driving member 123 is pivotally connected to a bracket 124 by means of a pivot pin 125 (Fig. 2). The bracket 124 is suitably attached to a driving bail 126. This driving bail 126 comprises a horizontally disposed plate like portion 127 which is bent at right angles to provide a re-enforcing rib 128 that extends upwardly and serves to increase the rigidity of the driving bail 126. The plate like portion 127 has its right and left ends (Fig. 3) bent downwardly to provide depending portions 129 and 130. The depending portions 129 and 130 have suitable apertures formed in them through which there extends a pivot shaft 131 which supports the driving bail 126 for oscillatory movement.

A driven bail 134 having depending sides 135 and 136 (Figs. 2 and 3) is also pivotally mounted on the pivot shaft 131 and partially rests within the bail 126. The driven bail 134 has an aperture 137 in it through which the bracket 124 extends. The driving bail 126 and driven bail 134 are normally urged to move together by a pair of hairpin type springs 139 and 140 which encircle the pivot shaft 131 and tend to clamp the driving bail 126 and driven bail 134 together for movement when the bail 126 is oscillated by the driving member 123.

The driven bail 134 is bent over at its right end (Fig. 2) to provide a depending portion 141 which is cut out as shown at 142 to provide a latching surface 143 for cooperation with a latch 144 mounted on the armature 145 of an electromagnet 146. The electromagnet 146 is mounted on a bracket 147 secured to the rear wall 13 of the housing 10. A contractile spring 148 attached to a portion of the bracket 147 and to the armature 145 tends to rock the armature 145 away from the electromagnet 146 into a position where the latch 144 will catch over the latching surface 143. As shown in Fig. 2 the electromagnet 146 is energized and consequently the latch 144 is drawn back toward the magnet 106 thus releasing the latch 144 from the latching surface 143 and permitting the driven bail 134 to be driven by the driving bail 126 through the instrumentality of the hairpin type springs 139 and 140.

In the embodiment of the invention disclosed herein eight sensing pins 120 are provided. By referring to Figs. 6 and 7 it will be seen that each of the sensing pins 120 comprises a sensing portion 155 and a shank portion 156 which are held in coaxial alignment by a coiled spring 157. The sensing portion 155 of each of the pins 120 has an externally threaded collar or enlarged portion 158 fixed to it or formed integrally with it. This collar is positioned near to but not at the bottom of the sensing portion 155. The bottom of the sensing portion 155 is flat as is the top of the shank portion 156. The shank portion 156 has an externally threaded collar 159 formed at a point near to but not at the upper end of the shank portion 156. The coiled spring 157, in a relaxed condition, has an inside diameter slightly less than the outside diameter of the collars 158 and 159 whereby when the coil spring 157 is threaded onto the two collars the two collars will be held together with their abutting ends spaced apart but with the upper end of the shank 156 and the lower end of the sensing portion 155 of the pin 120 held in abutting relation. Thus the pin 120 flexes adjacent its midpoint and the upper portion thereof may be moved with respect to the lower portion thereof but will always tend to come back to a position in coaxial alignment with the shank 156.

The lower end of the shank portion 156 of each of the pins 120 has a head 160 formed thereon which is slotted to receive a horizontally extending portion of a biasing spring 162 which has several coils wrapped around a rod 163 and which has a portion bearing against a fixed stop rod 164 on a pair of brackets 165 and 166. Bracket 165 is suitably fixed to the rear wall 13 of the housing 10 whereas the bracket 166 is mounted on a block 167 which is in turn suitably secured to the front wall 12 of the housing. The block 167 also supports a bracket 168 on which there is mounted a pin block 169. The pin block 169 is provided with a plurality of guide slots 170 equal in number to the number of pins 120. These slots 170 serve to guide the shanks of the pins 120 in moving upwardly or downwardly. A pin block cover plate 180 is suitably secured to the face of the pin block 169 to retain the shank portions 156 of the sensing pins 120 in the slots 170.

A slot 181 is formed in the pin block 169 and cover plate 180 to provide a space in which a portion of the feed sprocket 138 may freely move. The shank portions 156 of the pins 120 in addition to being guided by the guide slots 170 in the pin block 169 also pass through a series of slots 182 formed in the driven bail 134 and communicating with the cut out at 142 in the bail 134.

Figures 6, 7:
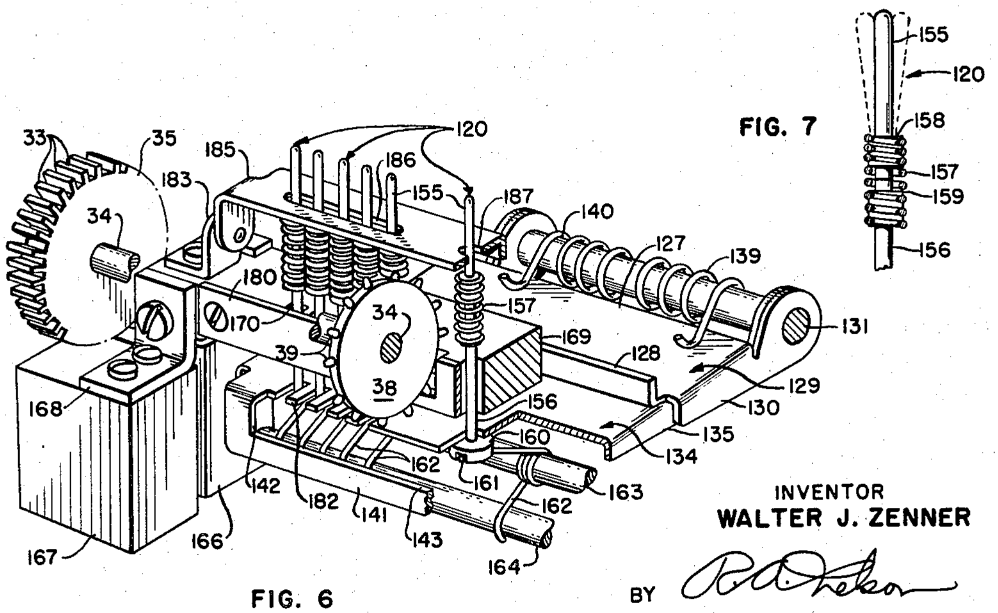
Fig. 6 is a detail view in perspective of a section of the reading mechanism.
Fig. 7 is a detail view of a sensing pin forming a part of the reader mechanism.

A pair of brackets 183 and 184 (Figs. 3 and 6) are mounted on the upper surface of the pin block 169 to pivotally support a pin guide bail 185 which is best shown in Fig. 6. The pin guide bail is provided with a pair of slots 186 and 187 which have the upper or sensing portion 155 of the sensing pins 120 extending through them. This pin guide bail 185 is free to oscillate with the sensing pins 120 when any one or more of the sensing pins 120, in their sensing operation, pass through perforations in the tape being read and are not completely retracted before the tape starts to move either in a forward or in a reverse direction. Since the sensing portions 155 of the pins 120 extend through the slots 186 or 187, any one of the sensing portions 155 that passes through an aperture in the tape being read may rock the pin guide bail 185. Thus, the time required for a reading or sensing operation is materially reduced.

The portion of the cover 14 of the housing in the area where the tape passes over it in moving through the tape slot 42 is slotted as shown at 188, Fig. 2, there being provided a slot for each pin 120 and a slot through which the feed sprocket 138 extends. The slots at 188 are aligned with a series of slots 189 formed in the tape lid or guide plate 41. The tape lid 41 has a pair of hinge brackets 190 (Figs. 1 and 3) which are provided with suitable apertures 191 to receive a hinge pin 192. The hinge pin 192 is supported by a hinge plate 193 suitably fixed to the cover 14 and the hinge pin 192 is readily removable so that the tape plate and parts supported thereby may be readily replaced.

Suitably fixed to the tape lid 41 is a contact box 194 (Figs. 2 and 3) comprising a base plate 195 and a cover 196. The base plate 195 is made of insulating material and has mounted on it eight posts 197 also of insulating material. These posts 197 each carry a fixed contact 198 in alignment with a movable or flexible contact 199. The movable contacts 199 are each individually mounted on a U-shaped bracket 200 riveted to the base plate 195 by rivets 201. The contacts 199 are made of a flexible material so that they may be moved or flexed to carry their right ends (Fig. 2), into engagement with an associated fixed contact 198. Each of the movable or flexible contacts 199 has associated with it a contact actuator 202. The contact actuators 202 are each made in two parts, the upper part 203 being made of insulating material and the lower part being made of metal. The upper part 203 and lower part 204 of the contact actuator 202 are separated by a shoulder 205 formed on the upper part 203. The lower part 204 of the contact actuator 202 passes through an aperture 206 in the base plate 195. These apertures 206 are aligned with the sensing pins 120 when the sensing pins are in their normal position. Suitable leads or conductors may be connected to the fixed contacts 198 and to the flexible contact 199 and then led out through the cover 196 to control other apparatus.

In the event that any of the mechanism within the contact box 194 becomes defective due to wear, the entire assemblage of the contact box and the tape lid 41 may be readily replaced by removing the hinge pin 192 and unlatching a latch 208. After a defective contact box and its plate assembly has been removed a new one may be placed in position by simply reinserting the hinge pin 192 through the apertures 191 in the brackets 190 and then rocking the assemblage down to a position where the latch 208 will hold it securely in place.

When the tape is being fed in a forward direction it is fed from a suitable supply under a roller 214 which is mounted on a bell crank lever 215. The bell crank lever 215 is pivoted on a shaft 216 that extends across the housing and is mounted in the front wall 12 and rear wall 13. A flexible contact 217 normally holds the bell crank lever 215 in the position shown in Fig. 2 by pressing against one of the arms of the bell crank lever 215 and when the flexible contact is in this position it is in contact with a fixed contact 218. Both the contact 217 and the contact 218 are mounted on a bracket 219 and suitably insulated one from the other. The pair of contacts 217 and 218 are what is known as "taut tape contacts" and have their terminals connected in series with the motor circuit whereby if the roller 214 is moved upwardly due to the tape catching, for some reason and forcing the roller 214 upwardly, contact 217 will be moved away from contact 218 to break the motor circuit and prevent damage to the tape.

In addition to the "taut tape contacts" 217 and 218 there is provided a pair of "tape out contacts" 222 and 223 (Fig. 2) which are held in a closed condition by tape passing under the tape lid 41. The terminals of the tape out contacts 222 and 223 are also connected in series with the drive motor circuit (not shown) and will open the circuit to the motor when there is no tape in the reader portion of the apparatus. The contacts 222 and 223 are mounted on a bracket 224 (Fig. 1) which is in turn mounted on the front wall 12 of the housing and extends over to a point where a horizontally disposed portion of an arm 225 of a lever designated generally by the numeral 226 will actuate them. The horizontally disposed portion of the arm 225 has a suitable pad of insulation 227 positioned on it to engage and actuate the contact 222 and move it into engagement with the contact 223. A vertically disposed portion of the arm 225 (Figs. 1 and 2) extends up through a slot 228 in the cover 14 and into an aligned slot 229 in the tape lid 41 when there is no tape in the slot 42 between the tape lid 41 and the upper surface of the cover 14. The vertically disposed portion of the arm 225 will thus assume the position shown in Fig. 2 when the supply of tape has been exhausted, being urged to this position by the spring contact 222. Thus while there is tape in the apparatus and in the slot 42 the pair of contacts 222 and 223 will be held closed to keep the drive motor, not shown, running.

The lever 226 is pivoted on the shaft 216 (Fig. 1)

and in addition to the arm 225 has an arm 249 which extends horizontally into position beneath a laterally extending portion 230 of a manually operable lever 231. In addition to the arm 230 the lever 231 is provided with a pair of arms 232 and 233. The arm 232 extends above an insulator 234 on a flexible contact spring 235. The contact spring 235 cooperates with a fixed contact spring 236 and both of the contact springs 236 and 235 are mounted on a suitable bracket 237 attached to the front wall 12. The terminals of the contact springs 235 and 236 are connected in series with the motor circuit and these two contacts are normally held closed.

The contact spring 235 normally holds the lever 231 in an upward position as shown in Fig. 2 where its arm 230 is maintained out of contact with the arm 249 on lever 226. The arm 233 of the lever 231 engages the latching pawl 107 which normally urges the lever 231 to the right as viewed in Figs. 1 and 2. The lever 231 is guided in its movements due to the fact that it has an upwardly extending projection 240 which extends through a slot 241 in a portion of the cover 14.

*Operation*

With the apparatus in the condition shown in the drawings a main power switch (not shown), may be operated to supply power to the motor (also not shown). However, the apparatus will not start to operate due to the fact that the motor circuit is interrupted at the contacts 222, 223. In order to load tape into the apparatus it will be necessary to move the vertically extending portion of the arm 225 of lever 226 out of the position shown in the drawings so that a tape may be fed through the slot 42. A strip of tape may be passed under the taut tape roller 214 and led up to the slot 42 whereupon the lever 231 may be operated by pressing it downwardly and to the left, Fig. 2. This operation of the lever 231 will effect three distinctly different operations. First, the arm 232 will open the contact pair 235 and 236 to interrupt the power supply to the motor prior to the second operation which is the closure of contact pair 222 and 223 that is effected by the arm 230 on lever 231 engaging arm 249 on lever 226. Thus, although lever 231 will rock lever 226 so that the vertically extending portion of arm 225 will be moved out of the path of tape to be inserted into the slot 42 the drive motor will not be started in operation at this time. Third, as the lever 231 is moved downwardly and to the left it will actuate the arm 233 to release the latching pawl 107 from engagement with the teeth 33 of the ratchet 35 thereby permitting free rotation of the ratchet 35 and free rotation of the feed sprocket 38.

After the tape has been loaded into the slot 42 and engaged with the feed sprocket 38 the lever 231 may be released and permitted to move upwardly under the influence of contact spring 235. The lever 231 will also be rocked to the right (Fig. 2), by the spring 110 moving the latching pawl 107 back into engagement with the teeth 33 on the ratchet 35. As soon as the lever 231 assumes the position shown in Fig. 2, with tape in the slot 42, the motor, not shown, will start to drive the shaft 19.

As a strip of tape is loaded into the slot 42 it deflects the sensing pins 120 from the position shown and consequently as soon as the shaft 19 starts to rotate the sensing pins 120 will be drawn downwardly by the bail 134 which is in turn moved downwardly by the driving bail 126. If the electromagnet 146 is held operated as shown in Fig. 2 the driving member 123 will continue to reciprocate the driving bail 126 and the driven bail 134 will follow the driving bail 126. The sensing pins will thus be reciprocated in timed relation to the feeding of the tape. Any time one of the pins which has been released by the driven bail 134 for movement upwardly by its spring 162, passes through the tape the pin will close the contact between its aligned fixed contact 198 and movable contact 199 in the contact box 194. As the tape starts to move the pin or pins which have passed through apertures in the tape will be flexed and will rock the pin guide bail 185 to either the right or the left, Fig. 2, depending upon the direction in which the feed sprocket 38 is being driven as controlled by the electromagnets 67 and 106.

Although a preferred form of the invention has been disclosed and described, it is obvious that changes may be made in the details set forth without departing from the spirit and scope of the invention.

What is claimed is:

1. Tape feeding apparatus for intermittently feeding indica bearing tape step by step through a tape sensing device comprising a driving shaft, an eccentric on said shaft, a driving pawl continuously driven by said eccentric and having a tooth engaging portion on its end remote from said eccentric, a link having one end pivotally connected to said pawl intermediate its ends, a locking lever pivotally connected to the opposite end of said link, a ratchet having teeth for engagement by said tooth engaging portion on the pawl, a tape feed means connected to said ratchet to be driven thereby, and means for holding said lever in either of two selected positions to maintain the tooth engaging portion of said pawl either in operative or in inoperative relation to said ratchet.

2. Tape feeding apparatus comprising a tape feeding wheel for engagement with a tape to be fed, a ratchet having teeth on it and connected to said wheel for driving it, a pawl having a tooth engaging portion engageable with the teeth on the ratchet for imparting step by step movement to said ratchet, an eccentric drive for actuating said pawl, a link pivotally attached to said pawl intermediate the tooth engaging portion of the pawl and the point of connection of the pawl and eccentric to hold an intermediate point on the pawl in an arcuate path when the pawl is driven by the eccentric drive and thus to guide the tooth engaging portion of the pawl in a substantially circular path, and means for pivotally supporting said link for movement to either of two selected positions to render said pawl operative or inoperative.

3. Tape feeding apparatus for intermittently feeding indicia bearing tape step by step through a tape sensing device comprising a driving shaft, a pair of eccentrics on said shaft, a pair of driving pawls continuously and individually driven by said eccentrics and each having a tooth engaging portion on its end remote from its eccentric, a link associated with each pawl and having its end pivotally connected to its associated pawl intermediate the ends of the pawl, a pair of locking levers individually pivotally connected to the opposite end of one of said links, a ratchet having teeth for engagement by the tooth engaging portions on the pawls, a tape feed means connected to said ratchet to be driven thereby, and means for holding each said locking levers in either of two selected positions to either maintain the tooth engaging portion of its associated pawl in operative or in inoperative relation to said ratchet.

4. Tape feeding apparatus comprising a tape feeding wheel for engagement with a tape to be fed, a ratchet having teeth on it and connected to said wheel for driving it, a pawl having a tooth engaging portion engageable with the teeth of said ratchet, means including a driving eccentric for intermittently driving said pawl when engaged with the ratchet at a constant rate of acceleration to a maximum speed and then at a constant rate of deceleration, and means operable to move said pawl from a position where its tooth engaging portion will not engage the teeth of the ratchet when the eccentric drives the pawl to a position to cause its tooth engaging portion to move in a path where it will engage and drive said ratchet.

5. Tape feeding apparatus for intermittently feeding indicia bearing tape step by step through a tape sensing device comprising a driving shaft, an eccentric on said shaft, a driving pawl continuously driven by said eccentric and having a tooth engaging portion on its end remote from said eccentric, a link having one of its end portions pivotally connected to said pawl intermediate the ends of said pawl, a locking lever pivotally connected to the opposite end of said link, a ratchet having teeth for engagement by said tooth engaging portion on the pawl, a tape feed means connected to said ratchet to be driven thereby, a latch lever for holding said locking lever in either of two selected positions to either maintain the tooth engaging portion of said pawl in operative or in inoperative relation to said ratchet, and an electromagnet having an armature for actuating said latch lever.

6. Tape feeding apparatus comprising a tape feeding wheel for engagement with a tape to be fed, a ratchet having teeth on it and connected to said wheel for driving it, a pawl having a tooth engaging portion engageable with the teeth on the ratchet for imparting step by step movement to said ratchet, an eccentric drive for actuating said pawl, an oscillatable link pivotally attached to said pawl intermediate the tooth engaging portion of the pawl and the point of connection of the pawl and eccentric to hold an intermediate point on the pawl in an arcuate path when the pawl is driven by the eccentric drive and thus to guide the tooth engaging portion of the pawl in a substantially circular path to impart rotation to the tape feeding wheel at a gradually accelerating rate and then at a decelerating rate, and electromagnetically actuated means operable for holding said link in an operative position.

7. Tape feeding apparatus for a printing telegraph reader comprising a pair of individually operable latching levers, an electromagnet individual to each latching lever and energizable for rocking said latching lever to an operative position, a locking lever individual to each latching lever and having a latch portion to be engaged by its associated latching lever upon movement of said latching lever to operative position, a link individual to each locking lever and pivotally connected to its associated locking lever, a pawl individual to each locking lever and pivotally connected to said link at a point remote from the point of connection of said link with the locking lever, a continuously rotating drive shaft, eccentric means on said shaft for driving said pawls, a ratchet positioned to be engaged by either one or the other of said pawls and to be driven in opposite directions by said pawls depending upon the pawl which engages it, and a tape feed wheel connected to be driven by said ratchet for feeding an indicia bearing tape into position to be read.

References Cited in the file of this patent

UNITED STATES PATENTS 734,215 Bilgram -------------- July 21, 1903